(12) United States Patent
Johnson (10) Patent No.: US 11,496,757 B2
(45) Date of Patent: Nov. 8, 2022

(54) METHODS, APPARATUSES, COMPUTER PROGRAMS AND COMPUTER-READABLE MEDIA FOR SCALABLE VIDEO CODING AND TRANSMISSION

(71) Applicant: V-NOVA INTERNATIONAL LIMITED, London (GB)

(72) Inventor: Robert Johnson, London (GB)

(73) Assignee: V-NOVA INTERNATIONAL LIMITED

( * ) Notice: Subject to any disclaimer, the term of this patent is extended or adjusted under 35 U.S.C. 154(b) by 14 days.

(21) Appl. No.: 17/290,472

(22) PCT Filed: Oct. 30, 2019

(86) PCT No.: PCT/GB2019/053067
§ 371 (c)(1),
(2) Date: Apr. 30, 2021

(87) PCT Pub. No.: WO2020/089615
PCT Pub. Date: May 7, 2020

(65) Prior Publication Data
US 2021/0409735 A1    Dec. 30, 2021

(30) Foreign Application Priority Data
Oct. 31, 2018 (GB) ...................................... 1817781

(51) Int. Cl.
*H04N 19/30* (2014.01)
*H04N 19/70* (2014.01)

(52) U.S. Cl.
CPC ............. *H04N 19/30* (2014.11); *H04N 19/70* (2014.11)

(58) Field of Classification Search
CPC ................................ H04N 19/30; H04N 19/70
See application file for complete search history.

(56) References Cited

U.S. PATENT DOCUMENTS

| | | |
|---|---|---|
| 2002/0141409 A1 | 10/2002 | Chang et al. |
| 2015/0264404 A1 | 9/2015 | Hannuksela |
| 2015/0304665 A1 | 10/2015 | Hannuksela et al. |

FOREIGN PATENT DOCUMENTS

EP    3131296    2/2017

OTHER PUBLICATIONS

Anonymous, "Scalable HEVC Encoding: how to setup cfg files for quality scalability?—stack overflow", Jun. 26, 2017, XP055660374, retrieved from the internet, URL: https://stackoverflow.com/questions/44203320/scalable-hevc-encoding-how-to-setup-cfg-files-for-quality-scalability [retrieved on Jan. 21, 2020].

(Continued)

*Primary Examiner* — Jae N Noh
(74) *Attorney, Agent, or Firm* — Workman Nydegger (57) ABSTRACT

Residual data is obtained based on first and second representations of an image at a first level of quality. The second representation is based on a representation of the image at a second, lower level of quality. The residual data is useable by a decoder to reconstruct the first representation using the second representation. A configuration message comprising a header part and a payload part is generated and output for processing by the decoder. The payload part comprises obtained configuration data relating to processing of the residual data. The header part comprises: (i) a message type parameter specifying a configuration message type and indicating a given payload format of the payload part, a format size of a payload part having said payload format is predetermined or can be determined from the content of the payload part, and (ii) a payload size parameter specifying the actual size of the payload part.

20 Claims, 8 Drawing Sheets

(56) References Cited

OTHER PUBLICATIONS

International Search Report and Written Opinion for PCT/GB2019/053067 dated Feb. 21, 2020.

FIG. 7 ns, computer
METHODS, APPARATUSES, COMPUTER PROGRAMS AND COMPUTER-READABLE MEDIA FOR SCALABLE VIDEO CODING AND TRANSMISSION

CROSS-REFERENCE TO RELATED APPLICATIONS

The present application is a 371 US Nationalization of International Application No. PCT/GB2019/053067, filed Oct. 30, 2019, which claims priority to United Kingdom Patent Application No. 1817781.6, filed Oct. 31, 2018, the disclosures of which are hereby incorporated by reference herein in their entirety.

TECHNICAL FIELD

This invention relates to methods, apparatuses, computer programs and computer-readable media. In particular, but not exclusively, this invention relates to methods, apparatuses, computer programs and computer-readable media for use in the processing of configuration information that relates to residual data useable to reconstruct a representation of an image at a relatively high level of quality.

BACKGROUND

Compression and decompression of signals is a consideration in many known systems. Many types of signal, for example video, may be compressed and encoded for transmission, for example over a data communications network. When such a signal is decoded, it may be desired to increase a level of quality of the signal and/or recover as much of the information contained in the original signal as possible.

Some known systems exploit scalable encoding techniques. Scalable encoding involves encoding a signal along with information to allow the reconstruction of the signal at one or more different levels of quality, for example depending on the capabilities of the decoder and the available bandwidth.

There are several considerations relating to the reconstruction of signals in a scalable encoding system. One such consideration is the amount of information that is stored, used and/or transmitted. The amount of information may vary, for example depending on the desired level of quality of the reconstructed signal, the nature of the information that is used in the reconstruction, and/or how such information is configured. Another consideration is the ability of the decoder to process received information reliably. One factor that may affect the reliability of the decoder is the ability of the decoder to handle errors and/or to handle received information that is unexpected, modified and/or unrecognised by the decoder.

SUMMARY

Various aspects of the present invention are set out in the appended claims.

Further features and advantages will become apparent from the following description of preferred embodiments, given by way of example only, which is made with reference to the accompanying drawings.

DETAILED DESCRIPTION

Figure 1:
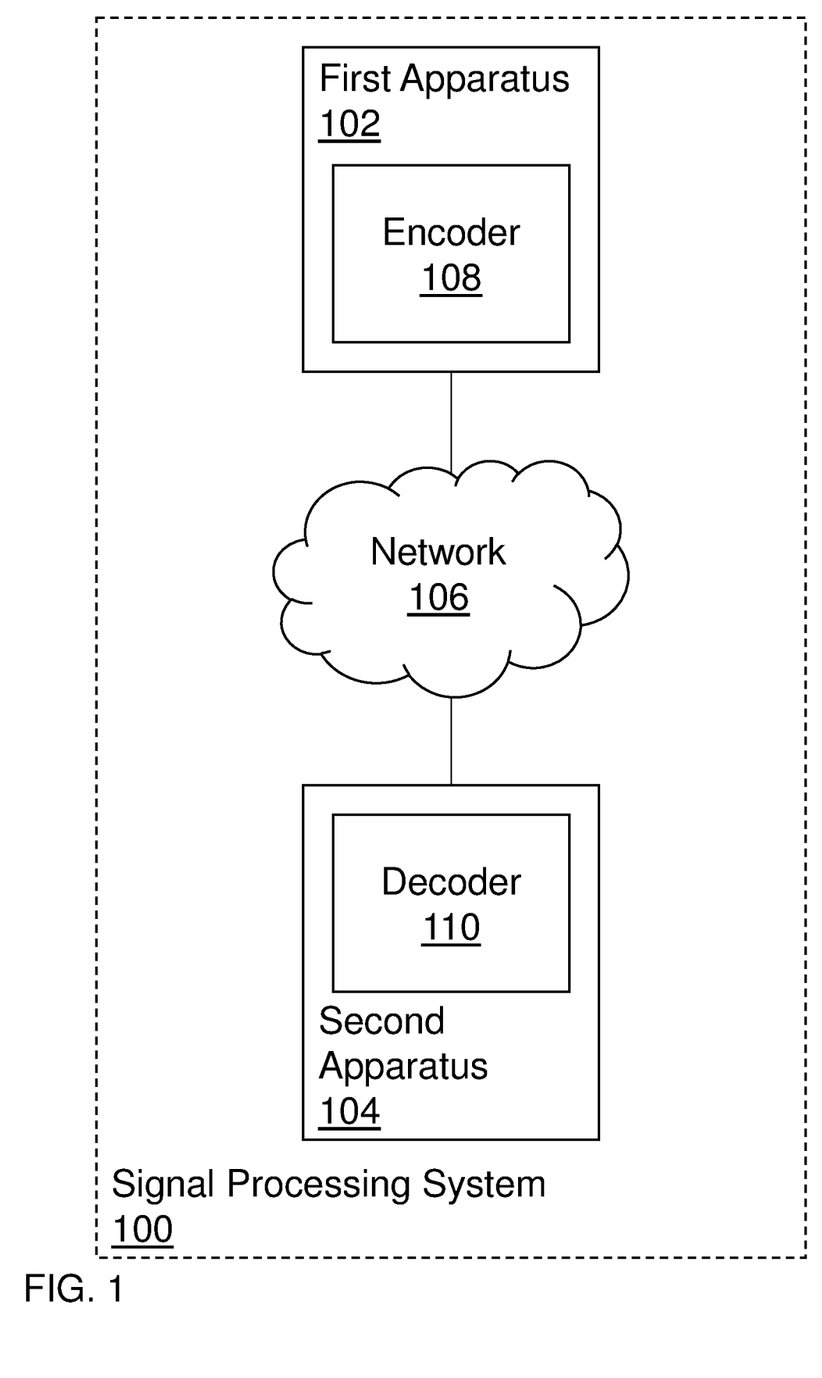
FIG. 1 shows a schematic block diagram of an example of a signal processing system in accordance with an embodiment of the present invention.

Referring to FIG. 1, there is shown an example of a signal processing system 100. The signal processing system 100 is used to process signals. Examples of types of signal include, but are not limited to, video signals, image signals, audio signals, volumetric signals such as those used in medical, scientific or holographic imaging, or other multidimensional signals.

The signal processing system 100 includes a first apparatus 102 and a second apparatus 104. The first apparatus 102 and second apparatus 104 may have a client-server relationship, with the first apparatus 102 performing the functions of a server device and the second apparatus 104 performing the functions of a client device. The signal processing system 100 may include at least one additional apparatus (not shown). The first apparatus 102 and/or second apparatus 104 may comprise one or more components. The one or more components may be implemented in hardware and/or software. The one or more components may be co-located or may be located remotely from each other in the signal processing system 100. Examples of types of apparatus include, but are not limited to, computerised devices, handheld or laptop computers, tablets, mobile devices, games consoles, smart televisions, set-top boxes, augmented and/or virtual reality headsets etc.

The first apparatus 102 is communicatively coupled to the second apparatus 104 via a data communications network 106. Examples of the data communications network 106 include, but are not limited to, the Internet, a Local Area Network (LAN) and a Wide Area Network (WAN). The first and/or second apparatus 102, 104 may have a wired and/or wireless connection to the data communications network 106.

The first apparatus 102 comprises an encoder 108. The encoder 108 is configured to encode data comprised in the signal, which is referred to hereinafter as "signal data". For example, where the signal is a video signal, the encoder 108 is configured to encode video data. Video data comprises a sequence of multiple images or frames. The encoder 108 may perform one or more further functions in addition to encoding signal data. The encoder 108 may be embodied in various different ways. For example, the encoder 108 may be embodied in hardware and/or software.

Although in this example the first apparatus 102 comprises the encoder 108, in other examples the first apparatus 102 is separate from the encoder 108. In such examples, the first apparatus 102 is communicatively coupled to the encoder 108. The first apparatus 102 may be embodied as one or more software functions and/or hardware modules.

The second apparatus 104 comprises a decoder 110. The decoder 110 is configured to decode signal data. The decoder 110 may perform one or more further functions in addition to decoding signal data. The decoder 110 may be embodied in various different ways. For example, the decoder 110 may be embodied in hardware and/or software.

Although in this example the second apparatus 104 comprises the decoder 110, in other examples, the second apparatus 104 is separate from the decoder 110. In such examples, the second apparatus 104 is communicatively coupled to the decoder 110. The second apparatus 104 may be embodied as one or more software functions and/or hardware modules.

The encoder 108 encodes signal data and transmits the encoded signal data to the decoder 110 via the data communications network 106. The decoder 110 decodes the received, encoded signal data and generates decoded signal data. The decoder 110 may output the decoded signal data, or data derived using the decoded signal data. For example, the decoder 110 may output such data for display on one or more display devices associated with the second apparatus 104.

In some examples described herein, the encoder 108 transmits to the decoder 110 a representation of a signal at a given level of quality and information the decoder 110 can use to reconstruct a representation of the signal at one or more higher levels of quality. Such information may be referred to as "reconstruction data". In some examples, "reconstruction" of a representation involves obtaining a representation that is not an exact replica of an original representation. The extent to which the representation is the same as the original representation may depend on various factors including, but not limited to, quantisation levels. A representation of a signal at a given level of quality may be considered to be a rendition, version or depiction of data comprised in the signal at the given level of quality. In some examples, the reconstruction data is included in the signal data that is encoded by the encoder 108 and transmitted to the decoder 110. For example, the reconstruction data may be in the form of metadata. In some examples, the reconstruction data is encoded and transmitted separately from the signal data.

The information the decoder 110 uses to reconstruct the representation of the signal at the one or more higher levels of quality may comprise residual data, as described in more detail below. Residual data is an example of reconstruction data. The information the decoder 110 uses to reconstruct the representation of the signal at the one or more higher levels of quality may also comprise configuration data relating to processing of the residual data. The configuration data may indicate how the residual data has been processed by the encoder 108 and/or how the residual data is to be processed by the decoder 110. The configuration data may be signaled to the decoder 110, for example in the form of metadata.

Figure 2A:
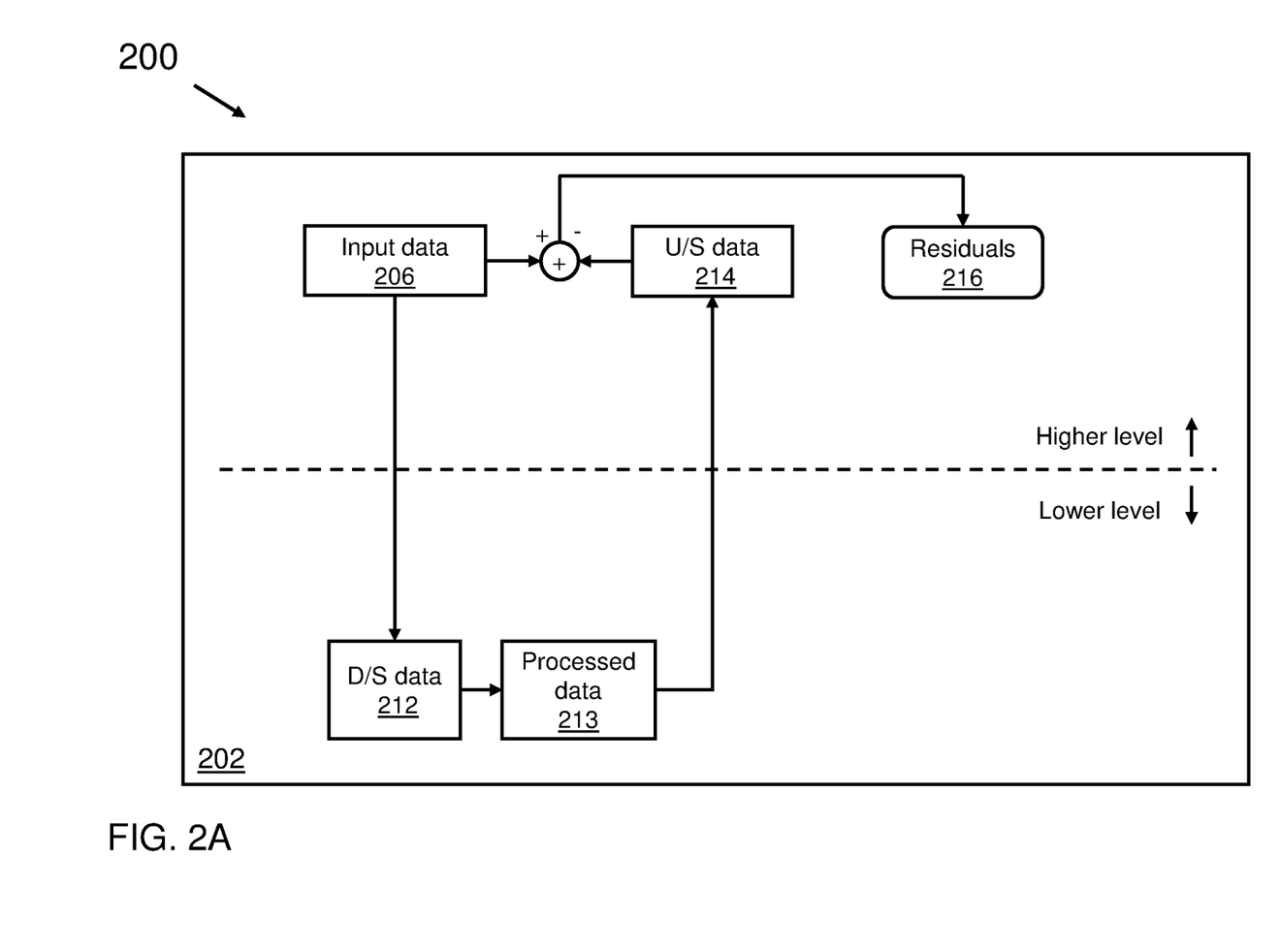
FIGS. 2A and 2B show a schematic block diagram of another example of a signal processing system in accordance with an embodiment of the present invention.
Figure 2B:
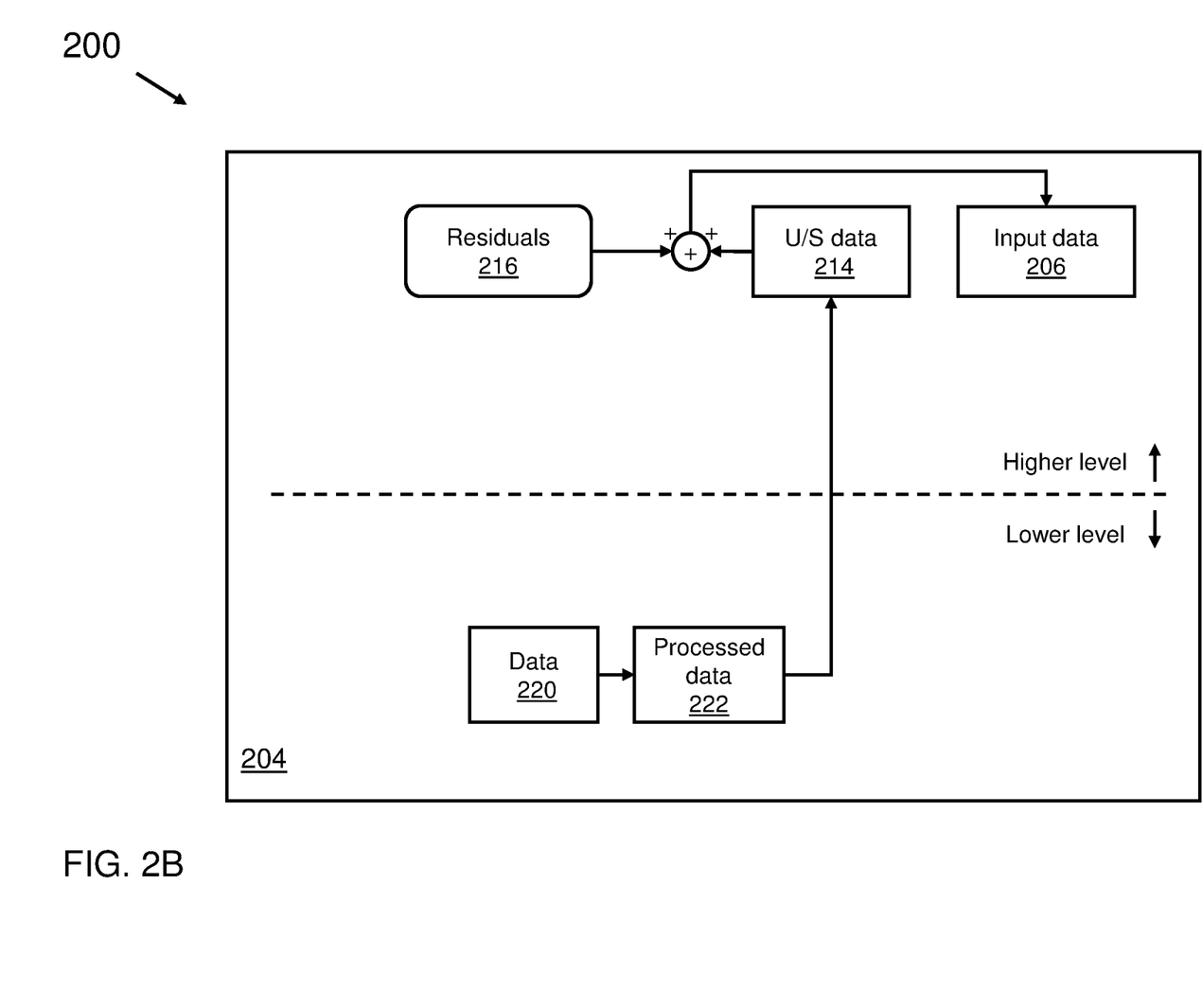

Referring to FIGS. 2A and 2B, there is shown schematically an example of a signal processing system 200. The signal processing system 200 includes a first apparatus 202 comprising an encoder and a second apparatus 204 comprising a decoder. In each of the first apparatus 202 and the second apparatus 204, items are shown on two logical levels. The two levels are separated by a dashed line. Items on the first, highest level relate to data at a relatively high level of quality. Items on the second, lowest level relate to data at a relatively low level of quality. The relatively high and relatively low levels of quality relate to a tiered hierarchy having multiple levels of quality. In some examples, the tiered hierarchy comprises more than two levels of quality. In such examples, the first apparatus 202 and the second apparatus 204 may include more than two different levels. There may be one or more other levels above and/or below those depicted in FIGS. 2A and 2B.

Referring first to FIG. 2A, the first apparatus 202 obtains a first representation of an image at a relatively high level of quality 206. A representation of a given image is a representation of data comprised in the image. The image may be a given frame of a video. The first representation of the image at the relatively high level of quality 206 will be referred to as "input data" hereinafter as, in this example, it is data provided as an input to the encoder in the first apparatus 202. The first apparatus 202 may receive the input data 206. For example, the first apparatus 202 may receive the input data 206 from at least one other apparatus. The first apparatus 202 may be configured to receive successive portions of input data 206, e.g. successive frames of a video, and to perform the operations described herein to each successive frame. For example, a video may comprise frames $F_1, F_2, \ldots F_T$ and the first apparatus 202 may process each of these in turn.

The first apparatus 202 derives data 212 based on the input data 206. In this example, the data 212 based on the input data 206 is a representation 212 of the image at the relatively low level of quality. In this example, the data 212 is derived by performing a downsampling operation on the input data 206 and will therefore be referred to as "downsampled data" hereinafter. In other examples, the data 212 is derived by performing an operation other than a downsampling operation on the input data 206.

In this example, the downsampled data 212 is processed to generate processed data 213 at the relatively low level of quality. In other examples, the downsampled data 212 is not processed at the relatively low level of quality. As such, the first apparatus 202 may generate data at the relatively low level of quality, where the data at the relatively low level of quality comprises the downsampled data 212 or the processed data 213.

In some examples, generating the processed data 213 involves encoding the downsampled data 212. Encoding the downsampled data 212 produces an encoded image at the relatively low level of quality. The first apparatus 202 may output the encoded image, for example for transmission to the second apparatus 204. A series of encoded images, e.g. forming an encoded video, as output for transmission to the second apparatus 204 may be referred to as a "base" stream. Instead of being produced in the first apparatus 202, the encoded image may be produced by an encoding device that is separate from the first apparatus 202. The encoded image may be part of an H.264 encoded video. Generating the processed data 213 may, for example, comprise generating successive frames of video as output by a separate encoding device such as an H.264 video encoder. An intermediate set of data for the generation of the processed data 213 may comprise the output of such an encoder, as opposed to any intermediate data generated by the separate encoding device.

Generating the processed data 213 at the relatively low level of quality may further involve decoding the encoded image at the relatively low level of quality. The decoding operation may be performed to emulate a decoding operation at the second apparatus 204, as will become apparent below. Decoding the encoded image produces a decoded image at the relatively low level of quality. In some examples, the first apparatus 202 decodes the encoded image at the relatively low level of quality to produce the decoded image at the relatively low level of quality. In other examples, the first apparatus 202 receives the decoded image at the relatively low level of quality, for example from an encoding and/or decoding device that is separate from the first apparatus 202. The encoded image may be decoded using an H.264 decoder. The decoding by a separate decoding device may comprise inputting encoded video, such as an encoded data stream configured for transmission to a remote decoding device, into a separate black-box decoder implemented together with the first apparatus 202 to generate successive decoded frames of video. Processed data 213 may thus comprise a frame of video data that is generated via a complex non-linear encoding and decoding process, where the encoding and decoding process may involve modelling spatio-temporal correlations as per a particular encoding standard such as H.264. However, because the output of any encoder is fed into a corresponding decoder, this complexity is effectively hidden from the first apparatus 202.

In an example, generating the processed data 213 at the relatively low level of quality further involves obtaining correction data based on a comparison between the downsampled data 212 and the decoded image obtained by the first apparatus 202, for example based on the difference between the downsampled data 212 and the decoded image. The correction data can be used to correct for errors introduced in encoding and decoding the downsampled data 212. In some examples, the first apparatus 202 outputs the correction data, for example for transmission to the second apparatus 204, as well as the encoded signal. This allows the recipient to correct for the errors introduced in encoding and decoding the downsampled data 212. This correction data may also be referred to as a "first enhancement" stream. As the correction data may be based on the difference between the downsampled data 212 and the decoded image it may be seen as a form of residual data (e.g. that is different from the other set of residual data described later below).

In some examples, generating the processed data 213 at the relatively low level of quality further involves correcting the decoded image using the correction data. For example, the correction data as output for transmission may be placed into a form suitable for combination with the decoded image, and then added to the decoded image. This may be performed on a frame-by-frame basis. In other examples, rather than correcting the decoded image using the correction data, the first apparatus 202 uses the downsampled data 212. For example, in certain cases, just the encoded then decoded data may be used and in other cases, encoding and decoding may be replaced by other processing.

In some examples, generating the processed data 213 involves performing one or more operations other than the encoding, decoding, obtaining and correcting acts described above.

The first apparatus 202 obtains data 214 based on the data at the relatively low level of quality. As indicated above, the data at the relatively low level of quality may comprise the processed data 213, or the downsampled data 212 where the downsampled data 212 is not processed at the lower level. As described above, in certain cases, the processed data 213 may comprise a reconstructed video stream (e.g. from an encoding-decoding operation) that is corrected using correction data. In the example of FIGS. 2A and 2B, the data 214 is a second representation of the image at the relatively high level of quality, the first representation of the image at the relatively high level of quality being the input data 206. The second representation at the relatively high level of quality may be considered to be a preliminary or predicted representation of the image at the relatively high level of quality. In this example, the first apparatus 202 derives the data 214 by performing an upsampling operation on the data at the relatively low level of quality. The data 214 will be referred to hereinafter as "upsampled data". However, in other examples one or more other operations could be used to derive the data 214, for example where data 212 is not derived by downsampling the input data 206. It should be noted that the references to relatively high and relatively low levels of quality may correspond to references to a first and second level of quality, where the second level of quality is higher than the first level of quality. As described herein, in certain cases, the levels of quality may correspond to different spatial resolutions.

The input data 206 and the upsampled data 214 are used to obtain residual data 216. The residual data 216 is associated with the image. The residual data 216 may be in the form of a set of residual elements. A residual element in the set of residual elements 216 may be associated with a respective image element in the input data 206. An example of an image element is a pixel.

In this example, a given residual element is obtained by subtracting a value of an image element in the upsampled data 214 from a value of a corresponding image element in the input data 206. As such, the residual data 216 is useable in combination with the upsampled data 214 to reconstruct the input data 206. The residual data 216 may also be referred to as "reconstruction data" or "enhancement data". In one case, the residual data 216 may form part of a "second enhancement" stream.

The first apparatus 202 obtains configuration data relating to processing of the residual data 216. The configuration data indicates how the residual data 216 has been processed and/or generated by the first apparatus 202 and/or how the residual data 216 is to be processed by the second apparatus 204. The configuration data may comprise a set of configuration parameters. The configuration data may be useable to control how the second apparatus 204 processes data and/or reconstructs the input data 206 using the residual data 216. The configuration data may relate to one or more characteristics of the residual data 216. Different configuration data may result in different processing being performed on and/or using the residual data 216. The configuration data is therefore useable to reconstruct the input data 206 using the residual data 216.

In this example, the first apparatus 202 transmits to the second apparatus 204 data based on the downsampled data 212, data based on the residual data 216, and the configuration data, to enable the second apparatus 204 to reconstruct the input data 206.

Turning now to FIG. 2B, the second apparatus 204 receives data 220 based on (e.g. derived from) the downsampled data 212. The second apparatus 204 also receives data based on the residual data 216. For example, the second apparatus 204 may receive a "base" stream (data 220), a "first enhancement stream" (any correction data) and a "second enhancement stream" (residual data 216). The second apparatus 204 also receives the configuration data relating to processing of the residual data 216. The data 220 based on the downsampled data 212 may be the downsampled data 212 itself, the processed data 213, or data derived from the downsampled data 212 or the processed data 213. The data based on the residual data 216 may be the residual data 216 itself, or data derived from the residual data 216.

In some examples, the received data 220 comprises the processed data 213, which may comprise the encoded image at the relatively low level of quality and/or the correction data. In some examples, for example where the first apparatus 202 has processed the downsampled data 212 to generate the processed data 213, the second apparatus 204 processes the received data 220 to generate processed data 222. Such processing by the second apparatus 204 may comprise decoding an encoded image (e.g. that forms part of a "base" encoded video stream) to produce a decoded image at the relatively low level of quality. In some examples, the processing by the second apparatus 204 comprises correcting the decoded image using obtained correction data. Hence, the processed data 222 may comprise a frame of corrected data at a first or relatively low level of quality. In some examples, the encoded image at the relatively low level of quality is decoded by a decoding device that is separate from the second apparatus 204. The encoded image at the relatively low level of quality may be decoded using an H.264 decoder.

In other examples, the received data 220 comprises the downsampled data 212 and does not comprise the processed data 213. In some such examples, the second apparatus 204 does not process the received data 220 to generate processed data 222.

The second apparatus 204 uses data at the relatively low level of quality to derive the upsampled data 214. As indicated above, the data at the relatively low level of quality may comprise the processed data 222, or the received data 220 where the second apparatus 204 does not process the received data 220 at the relatively low level of quality. The upsampled data 214 is a preliminary representation of the image at the relatively high level of quality. The upsampled data 214 may be derived by performing an upsampling operation on the data at the relatively low level of quality.

The second apparatus 204 obtains the residual data 216. The residual data 216 is useable with the upsampled data 214 to reconstruct the input data 206. The residual data 216 is indicative of a comparison between the input data 206 and the upsampled data 214.

The second apparatus 204 also obtains the configuration data related to processing of the residual data 216. The configuration data is useable by the second apparatus 204 to reconstruct the input data 206. For example, the configuration data may indicate a characteristic or property relating to the residual data 216 that affects how the residual data 216 is to be used and/or processed, or whether the residual data 216 is to be used at all. In some examples, the configuration data comprises the residual data 216.

There are several considerations relating to the use of such configuration data. One such consideration is the amount of information that is generated, stored, transmitted and/or processed. The more information that is used, the greater the amount of resources that may be involved in handling such information. Examples of such resources include transmission resources, storage resources and processing resources. Compared to some known techniques, examples described herein allow a relatively small amount of information to be used. This may reduce the amount of data transmitted via the data communications network 106. The savings may be particularly relevant where the data relates to high quality video data, where the amount of information transmitted in known systems can be especially high.

Another consideration relating to the use of such configuration data is the ability to adapt to different types of decoding device. For example, a given encoder may transmit information to a plurality of decoders each having different characteristics such as processing and/or storage capabilities. It is desirable for the use of configuration data in image reconstruction to be agnostic to the type and/or capability of decoder device that is used to perform the reconstruction. Compared to some known techniques, examples described herein enable different types of decoders having different operating characteristics to process configuration data reliably.

A further consideration relating to the use of such configuration data is the amount and/or the complexity of processing involved at the decoder in order to process the configuration data. Compared to some known techniques, examples described herein reduce an amount of processing performed by the decoder in order to obtain and/or process the configuration data.

Error handling is also a consideration. For example, the ability of the decoder to handle potential errors in the processing of configuration data may be a factor in the reliability of the decoder. Compared to some known techniques, examples described herein allow a decoder to handle potential errors as well as the receipt of unexpected or unrecognized data. This may effectively increase the reliability of decoder.

Figure 3:
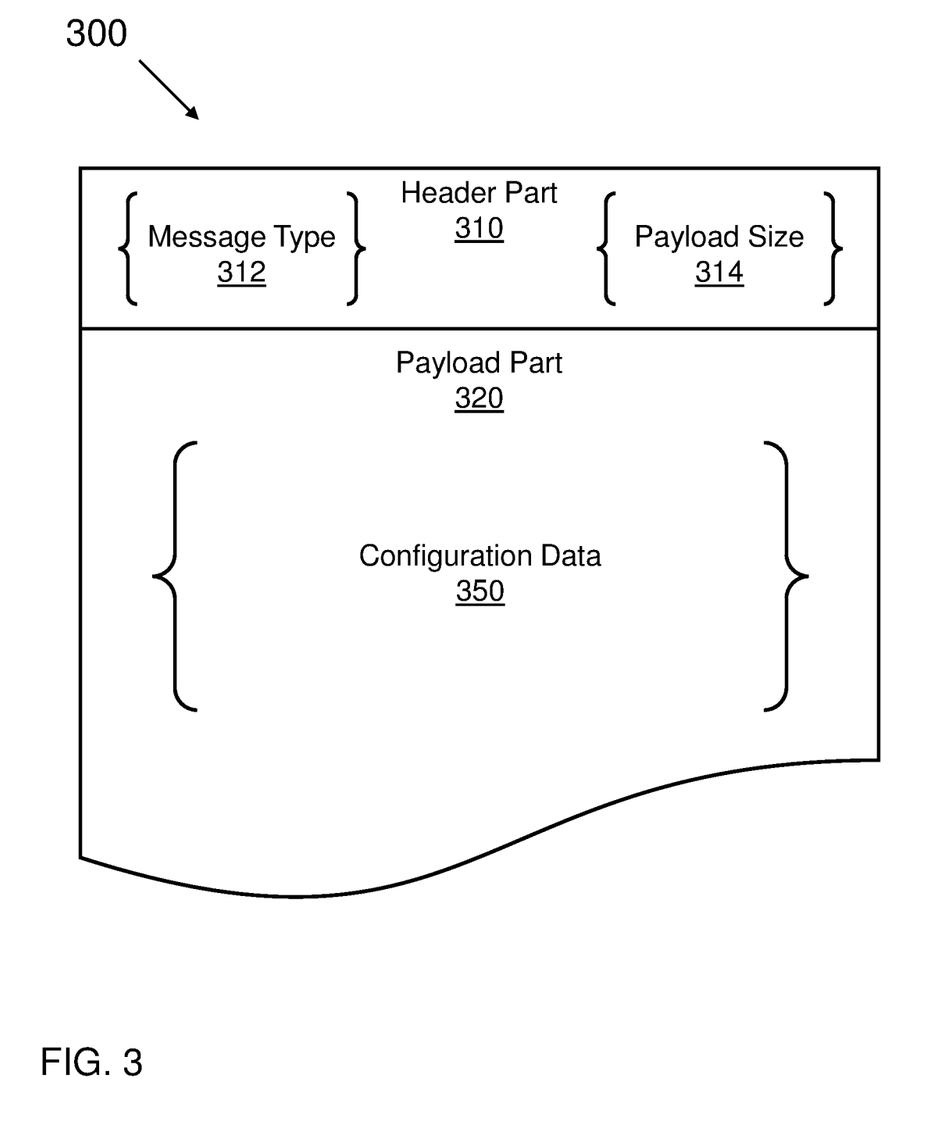
FIG. 3 shows a schematic diagram of an example of a configuration message in accordance with an embodiment of the present invention.

Referring to FIG. 3, there is shown schematically an example of a configuration message 300. An apparatus, for example the first apparatus 102 comprising the encoder 108, generates the configuration message 300 and outputs the configuration message 300 for processing by a further apparatus, for example the second apparatus 104 comprising the decoder 110.

The configuration message 300 comprises a header part 310 and a payload part 320. The payload part 320 comprises configuration data 350. The configuration data 350 is related to processing of residual data, for example residual data 216 as described above. In some examples, the configuration message 300 is an integer number of bytes long.

The header part 310 comprises a message type parameter 312. The message type parameter 312 specifies a message type of the configuration message 300. The message type specified by the message type parameter 312 may indicate how the configuration message 300 is to be processed. An example message type is an image set configuration message. An image set configuration message may correspond to multiple images in a set of images. Another example message type is an image configuration message. An image configuration message may correspond to a given image only in a set of images. Another example message type is an encoded data message. An encoded data message may be arranged to comprise encoded residual data for a given image. Another example message type is an encoder metadata message. An encoder metadata message may comprise metadata relating to one or more encoder characteristics. Another example message type is a decoder control message. A decoder control message may comprise instructions for controlling a decoder.

The message type parameter 312 is indicative of the payload part 320 having a given payload format. The payload format of the payload part 320 may be determined based on the message type of the configuration message 300. The payload format may define a set of configuration parameters of the configuration data 350 that are comprised in the payload part 320. In some examples, the payload format of the payload part 320 defines a particular processing logic that specifies how the content of the payload part 320 is to be processed. The payload part 320 has a format size. The format size of the payload part 320 corresponds to the payload format of the payload part 320. The format size of a payload part having a given payload format is predetermined or can be determined from the content of the payload part. For example, the format size may be determined based on the combined size of the individual configuration parameters that are defined by the payload format. The format size may be considered to be a possible size or a suggested size of the payload part 320.

The header part 310 also comprises a payload size parameter 314. The payload size parameter 314 specifies the actual size of the payload part 320. The actual size of the payload part 320 may be an integer number of bytes.

In some examples, the value of the payload size parameter 314 is stored in a fixed-length element. The fixed-length element storing the value of the payload size parameter 314 may comprise a predetermined number of bits in a given byte of the header part 310. For example, the value of the payload size parameter 314 may be stored in a fixed-length element comprising three bits in a one-byte header part.

In some examples, the payload size parameter 314 comprises a reference to a payload size look-up table that stores possible values of the actual size of the payload part 320. For example, the payload size parameter 314 may comprise a value that is useable to obtain the actual size of the payload part 320 from the payload size look-up table.

In some examples, the value of the payload size parameter 314 is stored in a variable-length element. This may be the case, for example, when the actual size of the payload part 310 is not one of the values specified in the payload size look-up table. The actual size of the payload part 310 specified by the payload size parameter 314 may have a variable bit-length. The variable-length element comprises an integer number of bytes. In some examples, at least one byte of the variable-length element has one or more predetermined bits arranged to indicate whether or not the variable-length element comprises one or more additional bytes to the at least one given byte. For example, a given byte of the variable-length element may contain seven bits that are arranged to store the payload size parameter 314, and one bit that is used to indicate whether or not there is a further byte following the given byte in the variable-length element. As such, the payload size parameter 314 may be represented using the variable-length element regardless of the bit-length of the payload size parameter 314. The variable-length element comprises the minimum number of bytes that are useable to store the value of the payload size parameter 314.

In some examples, data is stored in a fixed-length element that indicates that the value of the payload size parameter 314 is stored in a variable-length element. For example, if it is determined that the value of the payload size parameter 314 is one of a predetermined set of values, the value may be stored in the fixed-length element and/or the fixed-length element may include a reference to the payload size look-up table. If, on the other hand, it is determined that the value of the payload size parameter 314 is not one of the predetermined set of values, a variable-length element may be used to store the value, and the fixed-length element may be arranged to indicate, for example via a flag comprised in the fixed-length element, that the variable-length element is being used to store the value.

In this example, the header part 310 contains only the message type parameter 312 and the payload size parameter 314. In other examples, the header part 310 comprises one or more further parameters. In some examples, the header part 310 is one byte long. For example, the message type parameter 312 may be represented by five bits and the payload size parameter 314 may be represented by the remaining three bits of the one-byte header part 310. In other examples, for example where a variable-length element is used to represent the actual size of the payload part 320, the header part 310 comprises more than one byte.

The actual size of the payload part 320 may be the same as or different from the format size of the payload part 320. Regardless of whether or not the actual size and the format size are the same, the payload size parameter 314 specifying the actual size is included in the header part 310 of the configuration message 300.

Including a payload size parameter 314 that specifies the actual size of the payload part 320 when a possible size of the payload part 320, namely the format size, can be inferred from the message type parameter 312 may appear to be inefficient and/or a duplication of information, particularly when the format size and the actual size are the same. Including a payload size parameter 314 in the configuration message 300 involves a greater amount of data being used for the configuration message 300 compared to a case in which no such parameter is included. However, including the payload size parameter 314 in the configuration message 300 facilitates more efficient and reliable processing of the decoder 110 and/or improved error handling compared to a case in which no such parameter is used, as will be described in more detail below.

Figure 4:
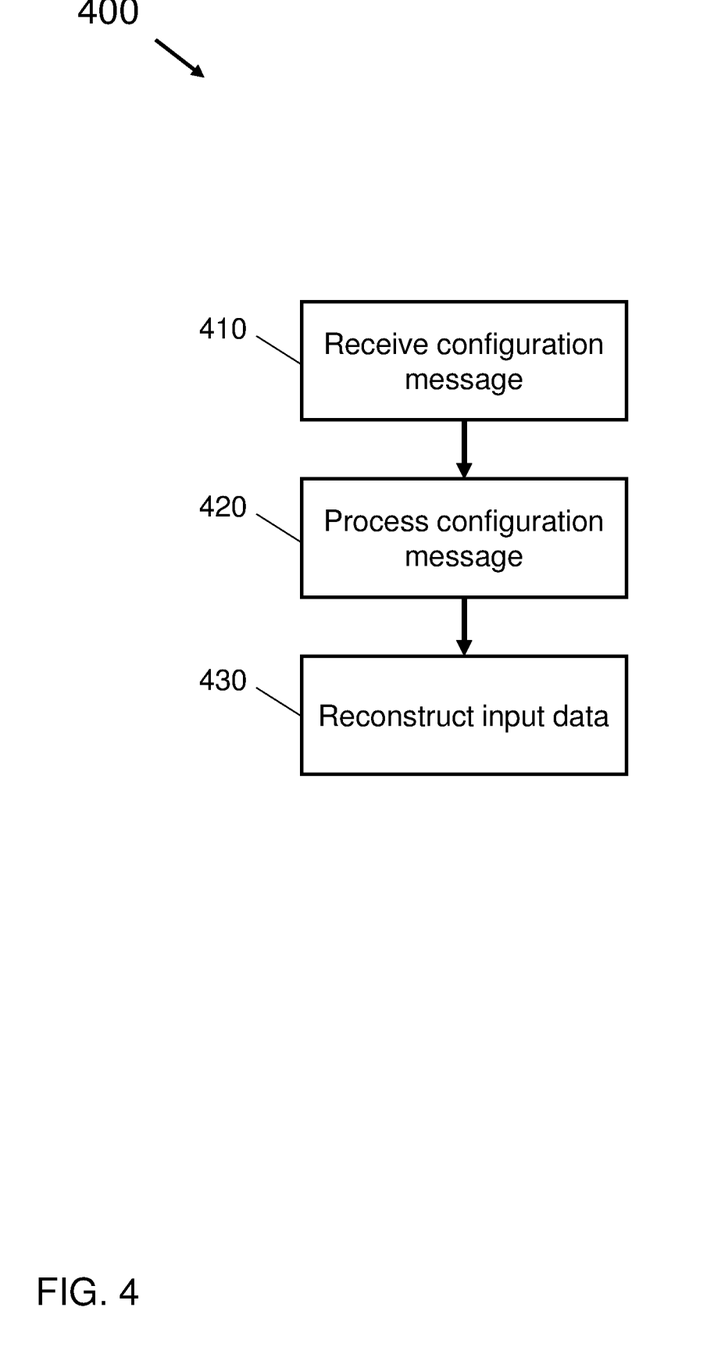
FIG. 4 is a flow diagram depicting an example of a method in accordance with an embodiment of the present invention.

Referring to FIG. 4, there is shown an example of a method 400 of processing configuration data. The method 400 may be performed by an apparatus comprising a decoder such as the second apparatus 104 described above.

In some examples, residual data is received. In this example, the received residual data is residual data 216 described above. The residual data 216 may be received from an encoder such as encoder 108. The residual data 216 is useable to reconstruct a first representation 206 of an image at a relatively high level of quality in a tiered hierarchy using a second representation 214 of the image at the relatively high level of quality. The second representation 214 is based on a representation 222 of the image at a relatively low level of quality in the tiered hierarchy. In some examples, data useable to derive the representation 222 at the relatively low level of quality is received from the encoder 108.

At item 410, a configuration message is received. In this example, the received configuration message is configuration message 300 described above. The configuration message 300 may be received from encoder 108.

At item 420, the received configuration message 300 is processed using the message type parameter 312 and the payload size parameter 314. The configuration message 300 is processed to obtain the configuration data 350 stored in the payload part 320 of the configuration message 300.

In some examples, processing the configuration message 300 comprises parsing the header part 310 of the configuration message 300 to obtain the message type parameter 312 and the payload size parameter 312. Based on the payload size parameter 314, the actual size of the payload part 320 is determined. Based on the message type parameter 312, the message type of the configuration message 300 is determined. The configuration message 300 may be processed in accordance with the determined message type and the determined actual size of the payload part 320.

Processing the configuration message 300 may comprise parsing the payload part 320 to obtain the configuration data 350. In some examples, processing the configuration message 300 comprises tracking the number of bytes of the configuration message 300 that have been read as the payload part 320 is parsed. The decoder 110 may detect the occurrence of an under-read if there is a determined discrepancy between the number of bytes read when parsing the payload part 320 and the actual size of the payload part 320 as specified by the payload size parameter 314. An under-read may be a potential source of errors when processing configuration messages.

In some examples, the payload size parameter 314 is used to determine the start of a following configuration message. The following configuration message may be a next successive configuration message relative to configuration message 300 in a sequence of configuration messages received by the decoder 110. The sequence of configuration messages may form part of configuration data. Configuration message 300 and the following configuration message may correspond to the same image or to different images. For example, configuration message 300 may correspond to a first image in an image sequence and the following configuration message may correspond to a second, different image in the image sequence.

In some examples, processing the configuration message 300 comprises discarding at least part of the content of the payload part 320. The at least part of the content of the payload part 320 may be discarded using the payload size parameter 314. For example, the decoder 110 may skip to the next configuration message, the start of the next configuration message having been determined using the payload size parameter 314, without processing at least part of the content of the payload part 320.

Using the payload size parameter 314 therefore enables the decoder 110 to handle possible under-reads in an efficient manner. Using the payload size parameter 314 to locate the start of the following message also enables the decoder 110 to maintain a correct alignment or synchronisation with a bytestream comprising multiple configuration messages. For example, even if the content and/or format of a given configuration message is unrecognised, unexpected and/or has been updated without the knowledge of the decoder 110, the decoder 110 is still able to locate the start of the following configuration message and thus remain synchronised with the bytestream. Furthermore, if a bytestream becomes malformed, the decoder 110 is able to detect when an over-read is about to occur and respond accordingly. For example, the decoder 110 may abort processing of the current configuration message and reset the bytestream to the determined location of the start of the next configuration message. Processing the configuration message 300 using the payload size parameter 314 therefore improves the reliability and/or adaptability of the decoder 110 compared to a case in which such a parameter is not used, in that the decoder 110 is able to handle configuration messages that have been modified and/or that are unrecognised and/or unexpected. The decoder 110 is also able to handle potential under-reads and over-reads without falling out of synch with the bytestream, thereby improving the ability of the decoder 110 to handle potential errors.

In some examples, processing the configuration message 300 comprises parsing first content of the payload part 320. The first content corresponds to the format size of the payload part 320. The first content may comprise the configuration data 350. The first content may comprise a first set of configuration parameters. Processing the configuration message 300 may further comprise discarding the remaining content of the payload part 320 using the payload size parameter 314. The remaining content of the payload part 320 comprises content of the payload part 320 that is not comprised in the first content. The remaining content comprises further configuration data. The remaining content may comprise a further set of configuration parameters. The presence of the remaining content may be determined by detecting a discrepancy between the format size and the actual size of the payload part 320. In other words, if it is determined that the actual size is greater than the format size, it is determined that additional content, beyond the content that is expected based on the format size, is present in the payload part 320.

At item 430, the first representation 206 is reconstructed using the obtained configuration data 350. The first representation 206 may be reconstructed by using the residual data 216 in accordance with the obtained configuration data 350.

Figure 5:
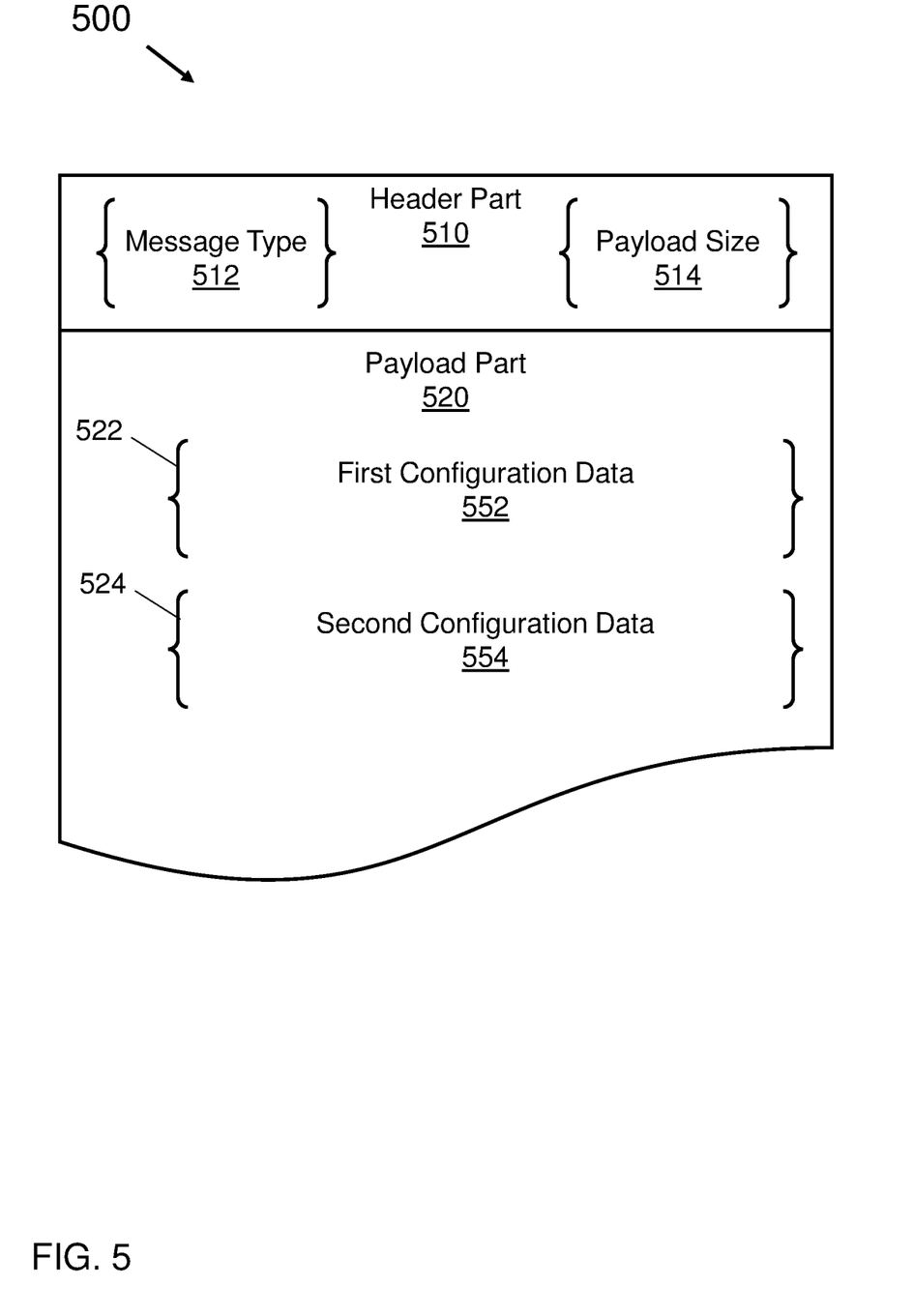
FIG. 5 shows a schematic diagram of another example of a configuration message in accordance with an embodiment of the present invention.

Referring to FIG. 5, there is shown schematically an example of a configuration message 500. An apparatus, for example the first apparatus 102 comprising the encoder 108, may generate the configuration message 500 and output the configuration message 500 for processing by a further apparatus, for example the second apparatus 104 comprising the decoder 110. Some items depicted in FIG. 5 are similar to items shown in FIG. 3. Corresponding reference signs, incremented by 200, have therefore been used for similar items.

Configuration message 500 comprises a header part 510 and a payload part 520. The header part 510 comprises a message type parameter 512. The message type parameter 512 specifies a message type of the configuration message 500. The message type indicates how the configuration message 500 is to be processed. The header part 510 also comprises a payload size parameter 514. The payload size parameter 514 specifies the actual size of the payload part 520.

In this example, the payload part 520 comprises a first payload portion 522. The first payload portion 522 comprises first configuration data 552 relating to processing of the residual data 216. The payload part 520 also comprises a second payload portion 524. In this example, the second payload portion 524 is arranged subsequently with respect to the first payload portion 522 in the payload part 520. Arranging the second payload portion 524 subsequently with respect to the first payload portion 522 may enable the first payload portion 522 to be received, processed and/or parsed by the decoder 110 before the second payload portion 524 is received, processed and/or parsed. The second payload portion 524 comprises second configuration data 554 relating to processing of the residual data 216.

The first and the second payload portions 522, 524 together form the payload part 520 of the configuration message 500. Therefore, the payload size parameter 514 is indicative of a total size of the first and the second payload portions 522, 524.

In some examples, the first payload portion 522 comprises all of the first configuration data 552. In some examples, the second payload portion 524 comprises all of the second configuration data 554. As such, the first and the second configuration data 552, 554 may be stored in separate portions of the payload part 520 of the configuration message 500. Storing the first configuration data 552 in a separate portion of the payload part 520 relative to the second configuration data 554 facilitates efficient handling of the content of the payload part 520 by a decoder, particularly for a decoder that is configured not to use and/or process one of the first and the second configuration data 552, 554.

In some examples, the header part 510 does not specify the size of the first payload portion 522 and/or the size of the second payload portion 524. In some examples, the size of the first payload portion 522 may be determined based on the format size indicated by the message type parameter 512. As such, the format size indicated by the message type parameter 512 may reflect the content of the first payload portion 522 but not the content of the second payload portion 524.

One or both of the first configuration data 552 and the second configuration data 554 may be useable to reconstruct the input data 206 using the residual data 216. In some examples, the second configuration data 554 comprises supplementary configuration data. The supplementary configuration data is arranged to supplement the first configuration data 552.

The first configuration data 552 relates to a first set of one or more decoders. The first set of one or more decoders has a first operating characteristic. An example of an operating characteristic is a processing capability. The second configuration data 554 relates to a second set of one or more decoders. The second set of one or more decoders has a second operating characteristic. The decoder 110 to which the configuration message 500 is transmitted may be comprised in the first set or the second set. The encoder 108 that generates the configuration message 500 may be unaware which set of decoders the decoder 110 is comprised in. The encoder 108 may transmit the configuration message 500 to multiple decoders across both sets of decoders.

In some examples, the first operating characteristic corresponds to a first version according to which the first set of one or more decoders is configured to operate, and the second operating characteristic corresponds to a second, different version according to which the second set of one or more decoders is configured to operate. The second version may be a later version relative to the first version. The first and second versions may be different versions of a syntax framework that defines how configuration messages are to be processed and/or that defines the content of such configuration messages. Therefore, when the syntax is updated from the first version to the second version, the second configuration data 554 is added to a configuration message that contains the first configuration data 552 from the first version. The second configuration data 554 may, for example, be appended to the first configuration data 552.

Adding the second configuration data 554 to a configuration message of an existing message type instead of generating a new message type to accommodate the second configuration data 554 reduces an amount of data that is stored, transmitted and/or processed compared to a case in which new message types are generated. By modifying the configuration of existing message types instead of defining new message types, the total number of configuration messages used to convey all relevant configuration data may be reduced. Each configuration message has a corresponding header which may, for example, be at least one byte long. Therefore, by reducing the overall number of configuration messages, the amount of data that is stored, transmitted and/or processed may be reduced.

In some examples, the decoder 110 is not able to process both the first and the second payload portion 522, 524. In one case, the encoder 108 may have undergone an update according to which the second configuration data 554 is included in the configuration message 500, but the decoder 110 may not have undergone such an update. In other words, the encoder 108 and the decoder 110 may operate according to different versions of the syntax. In such examples, there may be a discrepancy in the format size of the payload part 520 as interpreted by the encoder 108 and as interpreted by the decoder 110. For example, the format size according to the encoder 108, being aware of the additional content of the payload part 520 and the updated payload format following the version update, is different from the format size according to the decoder 110, since the decoder 110 is unaware of the additional content and the updated payload format and is operating according to the previous version. For the encoder 108, the format size is equal to the actual size of the updated payload part 520, but for the decoder 110 it is not. The format size alone may therefore be an unreliable indicator of the actual size of the payload part 520. Including the payload size parameter 514 that specifies the actual size of the payload part 520 therefore facilitates more reliable processing of the decoder 110, as described in more detail below.

Figure 6:
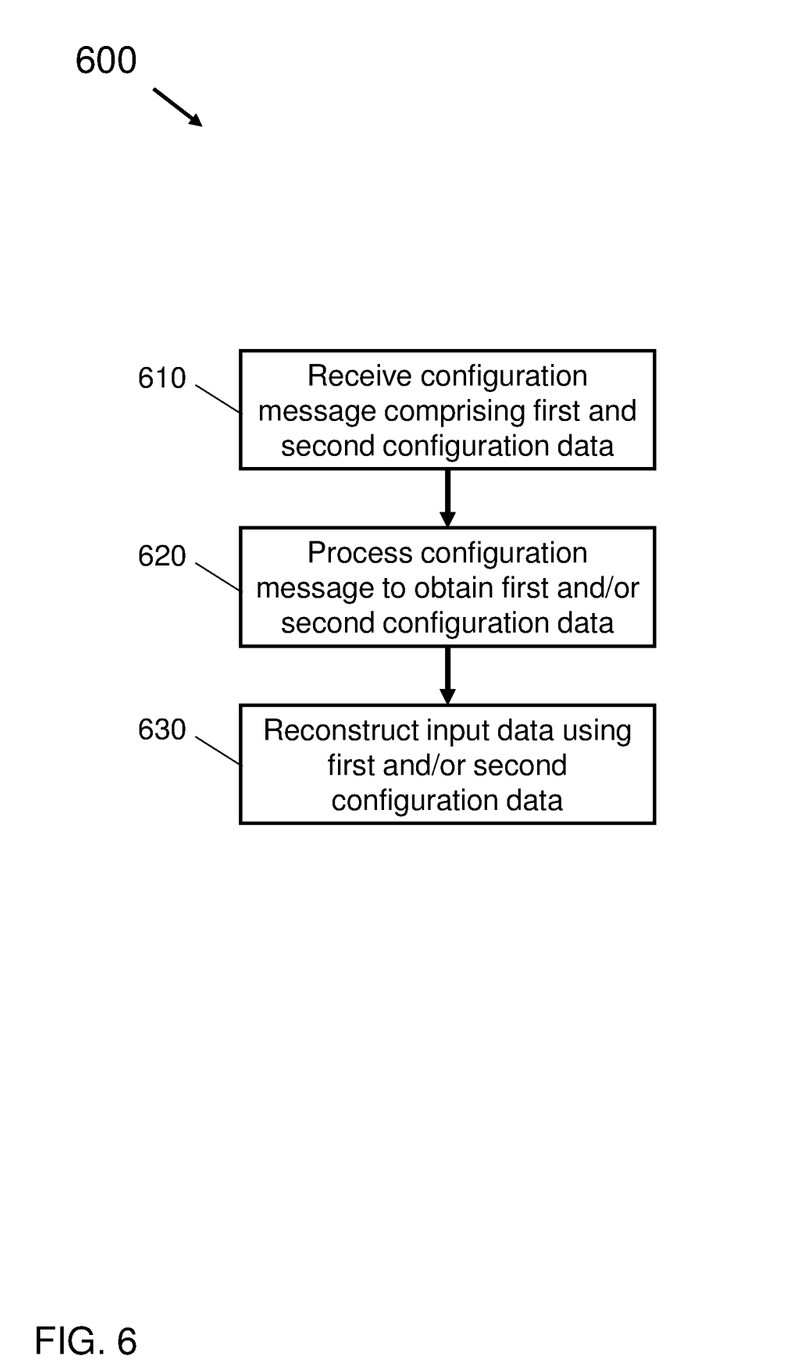
FIG. 6 is a flow diagram depicting another example of a method in accordance with an embodiment of the present invention.

Referring to FIG. 6, there is shown an example of a method 600 for processing configuration data. The method 600 may be performed by an apparatus comprising a decoder such as the second apparatus 104 described above.

At item 610, configuration message 500 is received.

At item 620, the configuration message 500 is processed to obtain one or both of the first configuration data 552 and the second configuration data 554.

In some examples, for example if the decoder 110 is in the first set of decoders, the first payload portion 522 is parsed by the decoder 110 and the second payload portion 524 is not parsed by the decoder 110. Parsing the first payload portion 522 but not the second payload portion 524 enables the decoder 110 to obtain the first configuration data 552 but not the second configuration data 554. In some examples, for example if the decoder 110 is in the second set of decoders, the second payload portion 524 is parsed by the decoder 110 and the first payload portion 522 is not parsed by the decoder 110. Parsing the second payload portion 524 but not the first payload portion 522 enables the decoder 110 to obtain the second configuration data 554 but not the first configuration data 552. In some examples, for example if the decoder 110 is in the second set of decoders, both the first payload portion 522 and the second payload portion 524 are parsed to obtain both the first configuration data 552 and the second configuration data 554.

The payload size parameter 514 may be used to determine the start of a following configuration message. In some examples, for example if the decoder 110 is in the first set of decoders, the content of the second payload portion 524 is discarded. The content of the second payload portion 524 comprises the second configuration data 554. The content of the second payload portion 524 may be discarded by using the total size of the payload part 520 specified in the payload size parameter 514. For example, the decoder 110 may read the content of the first payload portion 522 and then skip ahead to the next configuration message, the start of which having been located using the payload size parameter 514, without reading the content of the second payload portion 524.

Using the payload size parameter 514 to locate the start of the following message enables the decoder 110 to remain synchronised with a bytestream comprising multiple configuration messages. The decoder 110 may therefore process the configuration message 500 and locate the start of the following configuration message regardless of whether the decoder 110 is in the first set of decoders or the second set of decoders.

At item 630, the first representation 206 of the image at the relatively high level of quality is reconstructed. The first representation 206 is reconstructed using the one or both of the first configuration data 552 and the second configuration data 554 that is obtained at item 620. In a case where the decoder 110 obtains both the first and the second configuration data 552, 554, the first representation 206 of the image is reconstructed using both the first and the second configuration data 552, 554. In a case where the decoder 110 processes one of the first and the second payload portions 522, 524 but not the other of the first and the second payload portions 522, 524, the first representation 206 of the image may be reconstructed using the obtained one of the first and the second configuration data 552, 554. As such, the use of the configuration message 500 to reconstruct the first representation 206 may be agnostic to the type of decoder and/or to the version number according to which the decoder 110 is configured to operate.

In some examples, byte-wise processing is performed on the configuration message 500. In byte-wise processing, data is processed on a byte-by-byte basis. Processing configuration data in a byte-wise manner may be more efficient than processing the configuration data in a bit-wise manner. Bit-wise processing may involve tracking which bit within a given byte is the next bit to be read or written. When a group of bits that represents a given parameter straddles a byte boundary, additional processing may be performed in order to read the group of bits and obtain the given parameter. Such processing may be reduced in a case where byte-wise processing is performed. In some examples, a number of execution cycles may be reduced when processing data in a byte-wise manner compared to a bit-wise manner.

In some examples, configuration data is written to memory. Less processing may be involved in storing the configuration data in memory and/or in retrieving the configuration data from memory if the configuration data is handled in a byte-by-byte manner compared to a case in which the configuration data is handled in a bit-by-bit manner. The smallest unit of addressable memory may comprise one byte. As such, information may be stored in memory in a byte-wise manner. Therefore, fewer steps may be involved in storing the configuration data in memory and/or in retrieving the configuration data from memory if the configuration data is packaged into a sequence of bytes. An amount of padding used to package the configuration data into addressable memory units may also be reduced by providing the configuration data to the memory in a byte-wise form.

Furthermore, transmission of configuration data via a network such as the Internet may be performed more efficiently if the configuration data is arranged into a sequence of bytes. Data may be transmitted over the Internet via the Transmission Control Protocol (TCP). TCP operates in a transport layer of a protocol stack. TCP obtains data from a stream, packages the data into TCP segments and uses an internet module, for example the Internet Protocol (IP), to transmit each TCP segment to a recipient via the Internet. The data stream may be obtained from memory. A TCP segment may comprise an integer number of bytes. As such, less processing may be involved if the TCP obtains the data that is to be packaged into the TCP segments from a byte-wise stream than from a bit-wise stream. An amount of padding used to package the data into TCP segments may also be reduced by providing the data to the TCP in a byte-wise form.

Figure 7:
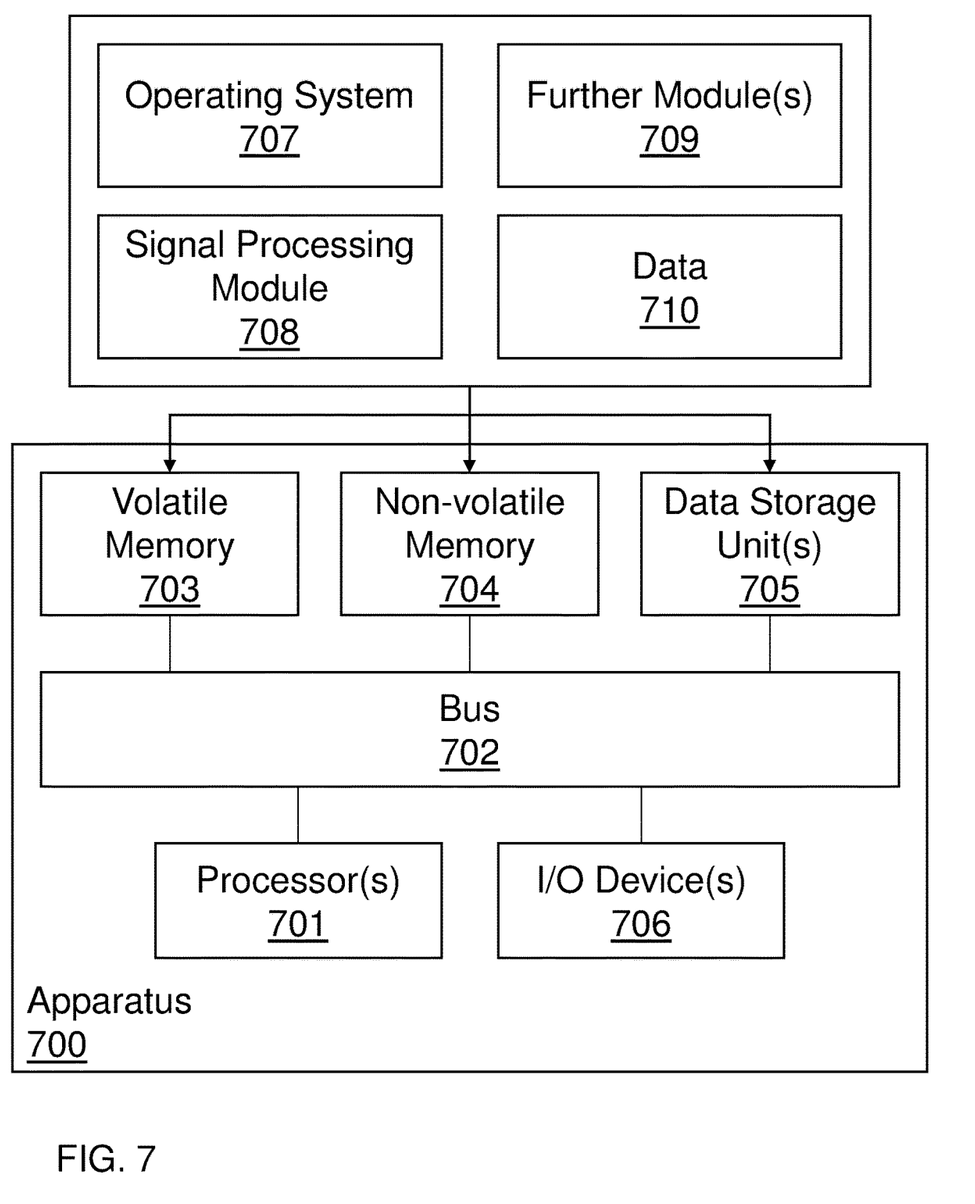
FIG. 7 shows a schematic block diagram of an example of an apparatus in accordance with an embodiment of the present invention.

Referring to FIG. 7, there is shown a schematic block diagram of an example of an apparatus 700.

In an example, the apparatus 700 comprises an encoder. In another example, the apparatus 700 comprises a decoder.

Examples of apparatus 700 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, or in general any type of computing or electronic device.

In this example, the apparatus 700 comprises one or more processors 701 configured to process information and/or instructions. The one or more processors 701 may comprise a central processing unit (CPU). The one or more processors 701 are coupled with a bus 702. Operations performed by the one or more processors 701 may be carried out by hardware and/or software. The one or more processors 701 may comprise multiple co-located processors or multiple disparately located processors.

In this example, the apparatus 700 comprises computer-useable volatile memory 703 configured to store information and/or instructions for the one or more processors 701. The computer-useable volatile memory 703 is coupled with the bus 702. The computer-useable volatile memory 703 may comprise random access memory (RAM).

In this example, the apparatus 700 comprises computer-useable non-volatile memory 704 configured to store information and/or instructions for the one or more processors 701. The computer-useable non-volatile memory 704 is coupled with the bus 702. The computer-useable non-volatile memory 704 may comprise read-only memory (ROM).

In this example, the apparatus 700 comprises one or more data-storage units 705 configured to store information and/or instructions. The one or more data-storage units 705 are coupled with the bus 702. The one or more data-storage units 705 may for example comprise a magnetic or optical disk and disk drive or a solid-state drive (SSD).

In this example, the apparatus 700 comprises one or more input/output (I/O) devices 706 configured to communicate information to and/or from the one or more processors 701. The one or more I/O devices 706 are coupled with the bus 702. The one or more I/O devices 706 may comprise at least one network interface. The at least one network interface may enable the apparatus 700 to communicate via one or more data communications networks. Examples of data communications networks include, but are not limited to, the Internet and a Local Area Network (LAN). The one or more I/O devices 706 may enable a user to provide input to the apparatus 700 via one or more input devices (not shown). The one or more input devices may include for example a remote control, one or more physical buttons etc. The one or more I/O devices 706 may enable information to be provided to a user via one or more output devices (not shown). The one or more output devices may for example include a display screen.

Various other entities are depicted for the apparatus 700. For example, when present, an operating system 707, data signal processing module 708, one or more further modules 709, and data 710 are shown as residing in one, or a combination, of the computer-usable volatile memory 703, computer-usable non-volatile memory 704 and the one or more data-storage units 705. The data signal processing module 708 may be implemented by way of computer program code stored in memory locations within the computer-usable non-volatile memory 704, computer-readable storage media within the one or more data-storage units 705 and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 700 may therefore comprise a data signal processing module 708 which can be executed by the one or more processors 701. The data signal processing module 708 can be configured to include instructions to implement at least some of the operations described herein. During operation, the one or more processors 701 launch, run, execute, interpret or otherwise perform the instructions in the signal processing module 708.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 700 may comprise more, fewer and/or different components from those depicted in FIG. 7.

The apparatus 700 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of processing configuration data, the method comprising:
obtaining residual data based on a first representation of an image at a first level of quality in a tiered hierarchy having multiple levels of quality and a second representation of the image at the first level of quality, the second representation being based on a representation of the image at a second, lower level of quality in the tiered hierarchy, the residual data being useable by a decoder to reconstruct the first representation using the second representation;
obtaining configuration data relating to processing of the residual data, the configuration data being useable by the decoder to reconstruct the first representation of the image;
generating a configuration message comprising a header part and a payload part, the payload part comprising the configuration data, the header part comprising:
a message type parameter that specifies a message type of the configuration message and that is indicative of the payload part having a given payload format in which a format size of a payload part having said payload format is predetermined or can be determined from the content of the payload part; and
a payload size parameter that specifies the actual size of the payload part; and outputting the configuration message for processing by the decoder to enable the decoder to reconstruct the first representation using the configuration data.

2. A method according to claim 1, wherein the format size and the actual size are the same.

3. A method according to claim 1, wherein the format size and the actual size are different.

4. A method according to claim 1, wherein the message type specified by the message type parameter indicates how the configuration message is to be processed.

5. A method according to claim 1, wherein the configuration message is an integer number of bytes long.

6. A method according to claim 1, wherein the actual size of the payload part is an integer number of bytes.

7. A method according to claim 1, wherein a value of the payload size parameter is stored in a fixed-length element.

8. A method according to claim 7, wherein the value of the payload size parameter is stored in the fixed-length element comprising three bits in a one-byte header part.

9. A method according to claim 7, wherein the payload size parameter comprises a reference to a payload size look-up table that stores possible values of the actual size of the payload part.

10. A method according to claim 9, wherein the value is useable to obtain the actual size of the payload part from the payload size look-up table.

11. A method according to claim 1,
wherein a value of the payload size parameter has a variable bit-length, and
wherein the value of the payload size parameter is stored in a variable-length element comprising an integer number of bytes.

12. A method according to claim 11, wherein the variable-length element comprises at least one given byte having one or more predetermined bits arranged to indicate whether or not the variable-length element comprises one or more additional bytes to the at least one given byte.

13. A method according to claim 11, wherein the value is not one of multiple values specified in a payload size look-up table.

14. A method according to claim 1, wherein the header part contains only the message type parameter and the payload size parameter.

15. A method of processing configuration data, the method comprising:
receiving a configuration message comprising a header part and a payload part, the payload part comprising configuration data relating to processing of residual data useable to reconstruct a first representation of an image at a first level of quality in a tiered hierarchy having multiple levels of quality using a second representation of the image at the first level of quality, the second representation being based on a representation of the image at a second, lower level of quality in the tiered hierarchy, the header part comprising:
a message type parameter that specifies a message type of the configuration message and that is indicative of the payload part having a given payload format in which a format size of a payload part having said payload format is predetermined or can be determined from the content of the payload part; and
a payload size parameter that specifies the actual size of the payload part;
processing the configuration message using the message type parameter and the payload size parameter to obtain the configuration data; and reconstructing the first representation using the obtained configuration data.

16. A method according to claim 15, wherein the processing the configuration message comprises:
    determining the actual size of the payload part based on the payload size parameter;
    determining the message type of the message based on the message type parameter; and
    processing the configuration message in accordance with the determined message type and the determined actual size of the payload part.

17. A method according to claim 15, wherein the format size and the actual size are the same.

18. A method according to claim 15, wherein the format size and the actual size are different.

19. A method according to claim 15, the method comprising:
    receiving the residual data; and
    using the residual data in accordance with the configuration data to reconstruct the first representation.

20. An apparatus configured to:
    receive a configuration message comprising a header part and a payload part, the payload part comprising configuration data relating to processing of residual data useable to reconstruct a first representation of an image at a first level of quality in a tiered hierarchy having multiple levels of quality using a second representation of the image at the first level of quality, the second representation being based on a representation of the image at a second, lower level of quality in the tiered hierarchy, the header part comprising:
    a message type parameter that specifies a message type of the configuration message and that is indicative of the payload part having a given payload format in which a format size of a payload part having said payload format is predetermined or can be determined from the content of the payload part; and
    a payload size parameter that specifies the actual size of the payload part;
    process the configuration message using the message type parameter and the payload size parameter to obtain the configuration data; and
    reconstruct the first representation using the obtained configuration data.

* * * * *